(12) United States Patent
Sawada

(10) Patent No.: US 12,091,118 B2
(45) Date of Patent: Sep. 17, 2024

(54) EXTERNAL DEVICE SUPPORT STRUCTURE OF SADDLE RIDING VEHICLE

(71) Applicant: SUZUKI MOTOR CORPORATION, Hamamatsu (JP)

(72) Inventor: Fujimi Sawada, Hamamatsu (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 1019 days.

(21) Appl. No.: 17/023,464

(22) Filed: Sep. 17, 2020

(65) Prior Publication Data

US 2021/0107583 A1 Apr. 15, 2021

(30) Foreign Application Priority Data

Oct. 10, 2019 (JP) ................ 2019-186584

(51) Int. Cl.
*B62J 11/19* (2020.01)
*B62J 50/21* (2020.01)
*B62J 50/22* (2020.01)

(52) U.S. Cl.
CPC ............ *B62J 11/19* (2020.02); *B62J 50/22* (2020.02); *B62J 50/225* (2020.02)

(58) Field of Classification Search
CPC ... B62J 11/00; B62J 11/13; B62J 11/19; B62J 45/00; B62J 45/10; B62J 45/20; B62J 50/21; B62J 50/22; B62J 50/225; B62J 9/20; B62K 27/16
USPC ...................................................... 224/413
See application file for complete search history.

(56) References Cited

U.S. PATENT DOCUMENTS

| | | | |
|---|---|---|---|
| 6,876,845 B1 | 4/2005 | Tabata et al. | |
| 7,411,307 B2 | 8/2008 | Uno | |
| 10,315,719 B2 | 6/2019 | Quade et al. | |
| 2001/0048403 A1* | 12/2001 | Tsuji | B62J 50/22 345/7 |
| 2005/0170791 A1 | 8/2005 | Tabata et al. | |
| 2016/0023636 A1 | 1/2016 | Keating et al. | |
| 2021/0197913 A1 | 7/2021 | Montez et al. | |

FOREIGN PATENT DOCUMENTS

| | | | |
|---|---|---|---|
| CN | 102963465 A | * 3/2013 | |
| CN | 104756148 A | 7/2015 | |
| CN | 105416450 A | * 3/2016 | ............... F16D 3/41 |
| DE | 60032979 T2 | 5/2007 | |

(Continued)

OTHER PUBLICATIONS

JP-2013060083-A Translation, Ando M, Apr. 2013 (Year: 2013).*

(Continued)

*Primary Examiner* — Nathan J Newhouse
*Assistant Examiner* — Matthew T Theis
(74) *Attorney, Agent, or Firm* — Holtz, Holtz & Volek PC

(57) ABSTRACT

In a saddle riding vehicle (1) including an external device (26) in which an external device (30) is installable, and a connector (27) for connecting the external device, the external device holder is located in front of a rider and above or in front of an instrument section, the connector is provided on one side (24*b*) in a vehicle body left-right direction, of the instrument section, and a cable supporter (29) that supports a cable (31) connecting to the connector is provided on a same one side (22*b*) of the instrument section.

9 Claims, 8 Drawing Sheets

(56) References Cited

FOREIGN PATENT DOCUMENTS

| | | | |
|---|---|---|---|
| DE | 102007045515 B4 | | 9/2010 |
| JP | 2013060083 A | * | 4/2013 |
| JP | 2014065422 A | | 4/2014 |
| JP | 2018154268 A | * | 10/2018 |
| JP | 6776807 B2 | | 10/2020 |

OTHER PUBLICATIONS

CN-102963465-A Translation, Ando M, Mar. 2013 (Year: 2013).*
JP-2018154268-A Translation, Ogawara K, Oct. 2018 (Year: 2018).*
CN-105416450-A Translation, Kawatani T, Mar. 23, 2016 (Year: 2016).*
German Office Action (and English language translation thereof) dated Jul. 28, 2022, issued in counterpart German Application No. 10 2020 124 239.5.
German Office Action (and an English translation thereof) dated Mar. 11, 2024, issued in counterpart German Application No. 10 2020 124 239.5.

* cited by examiner

EXTERNAL DEVICE SUPPORT STRUCTURE OF SADDLE RIDING VEHICLE

BACKGROUND OF THE INVENTION

Field of the Invention

The present invention relates to an external device support structure of a saddle riding vehicle.

Description of the Related Art

There is known a saddle riding vehicle such as a motorcycle that includes a connection terminal (accessary socket) to connect an external device such as electronic equipment to perform power supply and signal communication. When connecting the external device and the connection terminal by a cable (wire harness) in this type of vehicle, it is necessary to consider that the cable does not affect a driving operation and traveling of the vehicle, and that the connection stability of the cable is secured. For example, when the cable to connect the external device is routed in the vicinity of the handle, it is required to prevent the cable from touching or interfering with the handle and affecting steerability. Further, it is also required to prevent the cable from swaying due to vibrations and running wind during traveling to offend the rider's eye, and to prevent the cable from being pulled by the handle to apply a load on the connection terminal and the electronic equipment.

The motorcycle in Patent Literature 1 (Japanese Patent Application Laid-Open No. 2014-65422) is configured such that the electric connection terminal is disposed on a vehicle rear side from the instrument, on the vehicle front side from the handle, and at a substantially center in the vehicle width direction, and the cable has no extra slack, so that the cable is easily fixed.

In a saddle riding vehicle, instruments such as a meter (indicator) are often provided in the vicinity of the center in the vehicle width direction, in front of the handle. Further, external devices such as a personal digital assistant (a smartphone and a portable navigation device) that are connected to the connection terminal via the cable also often secure the installation location in the vicinity of the center in the vehicle width direction in front of the handle, from the viewpoint of visibility and operability. Consequently, if the connection terminal on the vehicle side is provided at the center in the vehicle width direction, there is the possibility that the cable extending from the external device to the connection terminal crosses the panel of the instrument or the screen of the external device to affect visibility, or that the cable vibrates in the vicinity of the instruments due to influence of the running wind to be an offense to the eye. Even if a structure for supporting the cable in the midway is provided as a countermeasure, there is the problem in that it is difficult to provide the support portion for the cable on the panel of the instrument.

SUMMARY OF THE INVENTION

The present invention is made in the light of the above point, and provides an external device support structure of a saddle riding vehicle capable of functionally supporting an external device and a connecting cable and improving convenience of the external device and the connecting cable, and comfortability during traveling of the vehicle when the external device is installed in front of a rider of the saddle riding vehicle.

The present invention is, in a saddle riding vehicle including an external device holder in which an external device is installable, and a connector for connecting the external device, characterized in that the external device holder is located in front of a rider and above or in front of an instrument section, the connector is provided on one side in a vehicle body left-right direction, of the instrument section, and a cable supporter that supports a cable that is connected to the connector is provided on the one side of the instrument section.

According to the external device support structure of a saddle riding vehicle of the present invention, the connector and the cable supporter are included on one side in the vehicle body left-right direction, of the instrument section, whereby the cable that is connected to the connector can be disposed sideward of the instrument section with high space efficiency, and can be stably supported without interfering with the instrument section and the external device. As a result, the external device and the connecting cable can be functionally supported, and convenience of the external device and the connecting cable, and comfortability at the time of traveling of the vehicle can be improved.

The present disclosure relates to subject matter contained in Japanese Patent Application No. 2019-186584 (filed on Oct. 10, 2019) which is expressly incorporated herein by reference in its entirety.

DETAILED DESCRIPTION OF THE PREFERRED EMBODIMENTS

Hereinafter, an external device support structure of a saddle riding vehicle according to a present embodiment will be described with reference to the accompanying drawings. The present embodiment is applied to a motorcycle 1 (FIG. 1) as the saddle riding vehicle, and respective directions such as up and down, left and right, and front and rear in the following explanation mean directions with a vehicle body 2 of the motorcycle 1 as a reference.

Figure 1:
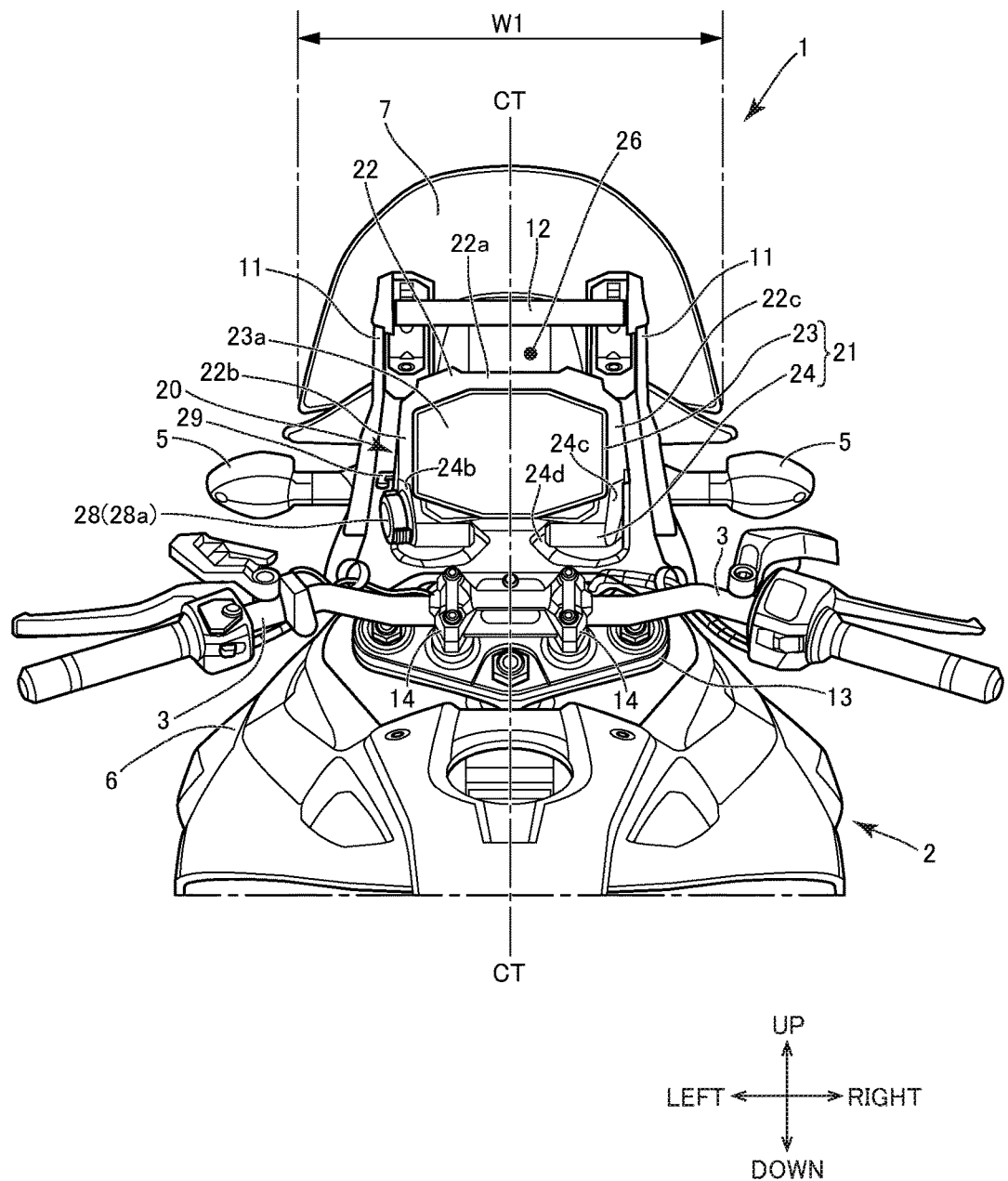
FIG. 1 is a view illustrating a handle, and an instrument section and a periphery of the instrument section of a motorcycle according to a present embodiment from behind.

FIG. 1 is a front view of a part of the motorcycle 1 seen from behind. A center CT in a left-right direction of the vehicle body 2 of the motorcycle 1 is virtually shown by an alternate long and short dashed lines in FIG. 1 and FIG. 6. The motorcycle 1 has handles 3 protruding left and right from a front side upper portion of the vehicle body 2, and a rider steers a front wheel (not illustrated) via the handles 3. A headlight 4 (FIG. 4) is provided on a front surface of the vehicle body 2 that is lower than the handle 3, and above the headlight 4, a pair of left and right direction indicators 5 are provided. A vehicle body front part around the headlight 4 is covered with a front cowl 6. At a vehicle body front surface upper portion above the front cowl 6, a windshield (windscreen) 7 is provided. The windshield 7 is located in front of the rider of the motorcycle 1, and shields running wind toward the rider, or protects the rider from a flying object from a front, with the front cowl 6. A width W1 of the windshield 7 in a vehicle body left-right direction is shown in FIG. 1.

Figure 4:
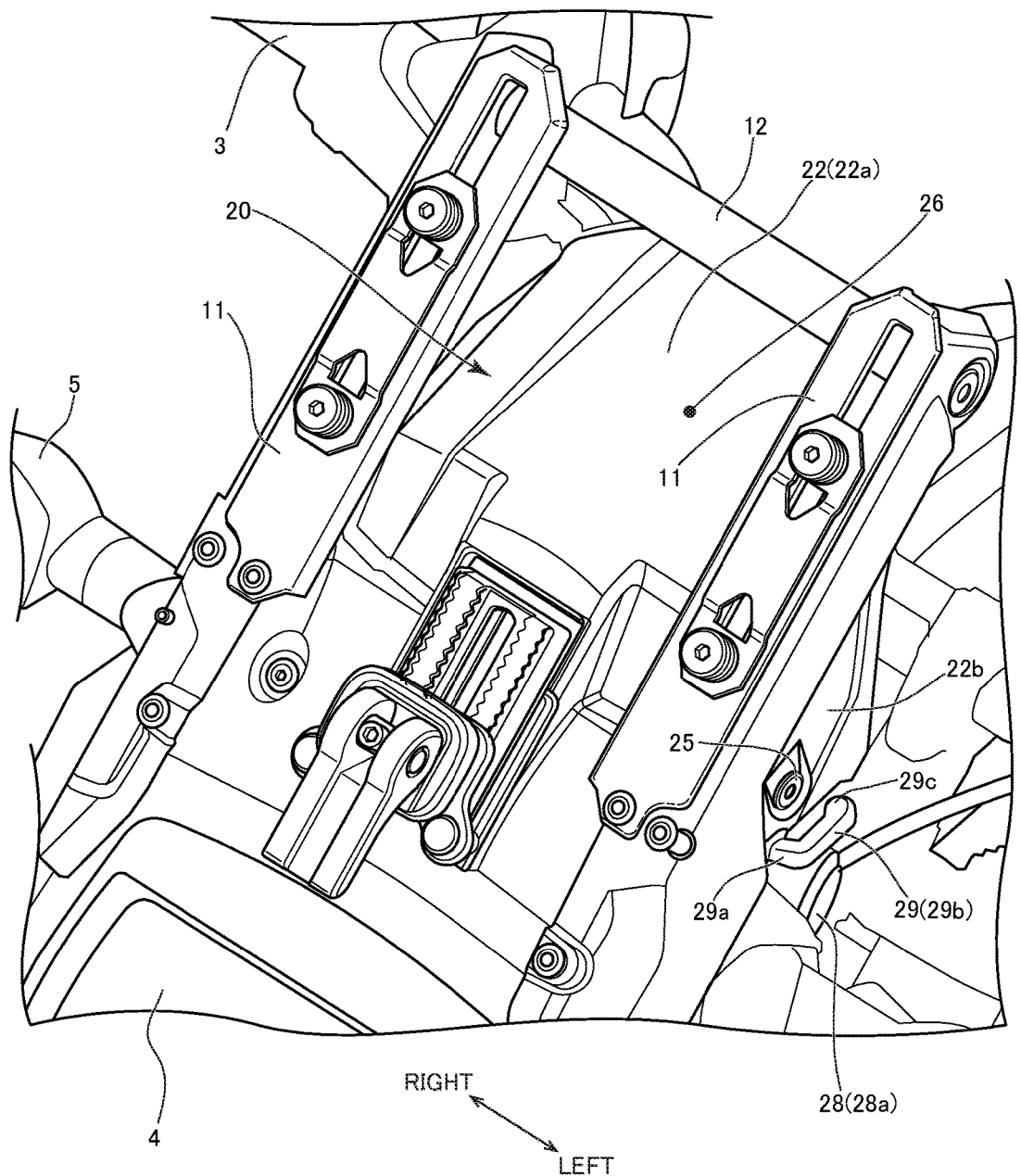
FIG. 4 is a perspective view illustrating the instrument section and the periphery of the instrument in a state where a windshield is removed, from diagonally front.

FIG. 4 illustrates a support structure for the windshield 7 in a state where the windshield 7 is removed. A pair of stays 11 are provided with positions made different in the left-right direction of the vehicle body 2, above the front cowl 6. The pair of stays 11 are arranged substantially symmetrically about the center CT (FIG. 1, FIG. 6) in the left-right direction of the vehicle body 2, and lower end sides of the respective stays 11 are fixed to a frame structure (not illustrated) that configures a frame of the vehicle body 2. Vicinities of upper ends of the pair of stays 11 are connected by a tubular cross girder portion 12 extending in the left-right direction, and rigidity of the pair of stays 11 is secured. The windshield 7 is supported movably in a vehicle body up-down direction via the pair of stays 11, and a height position of the windshield 7 can be changed by an operation of the rider.

Figure 2:
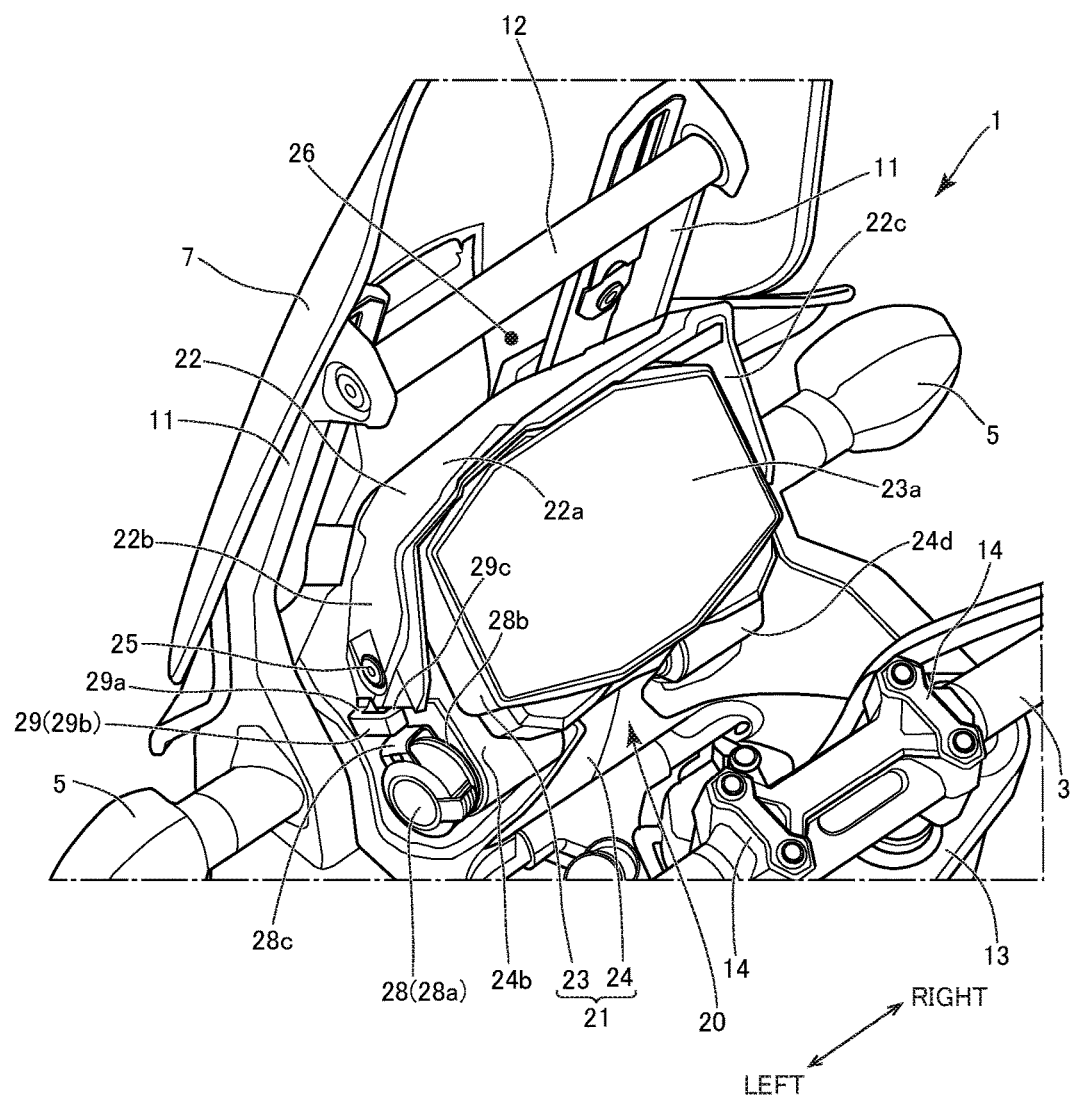
FIG. 2 is a perspective view illustrating the instrument section and the periphery of the instrument section from diagonally behind.

As illustrated in FIG. 1 and FIG. 2, behind the pair of stays 11, a top bridge 13 is provided between the handles 3 protruding left and right of the vehicle body 2, and the handles 3 are fixed to the top bridge 13 by handle clamps 14. An upper end of a steering shaft (not illustrated) rotatably supported by a head pipe (not illustrated) that configures the frame of the vehicle body 2, and upper ends of a left and right front forks (not illustrated) that support the front wheel are fixed to the top bridge 13 to configure a steering mechanism that transmits operations of the handles 3 to the front wheel. Note that the steering mechanism is not limited to this. For example, the handles 3 in the present embodiment is a bar handle of an integral structure continuing in the vehicle body left-right direction, but unlike this handle, separate type handles configured by a right handle and a left handle that are separate bodies may be adopted.

Figure 6:
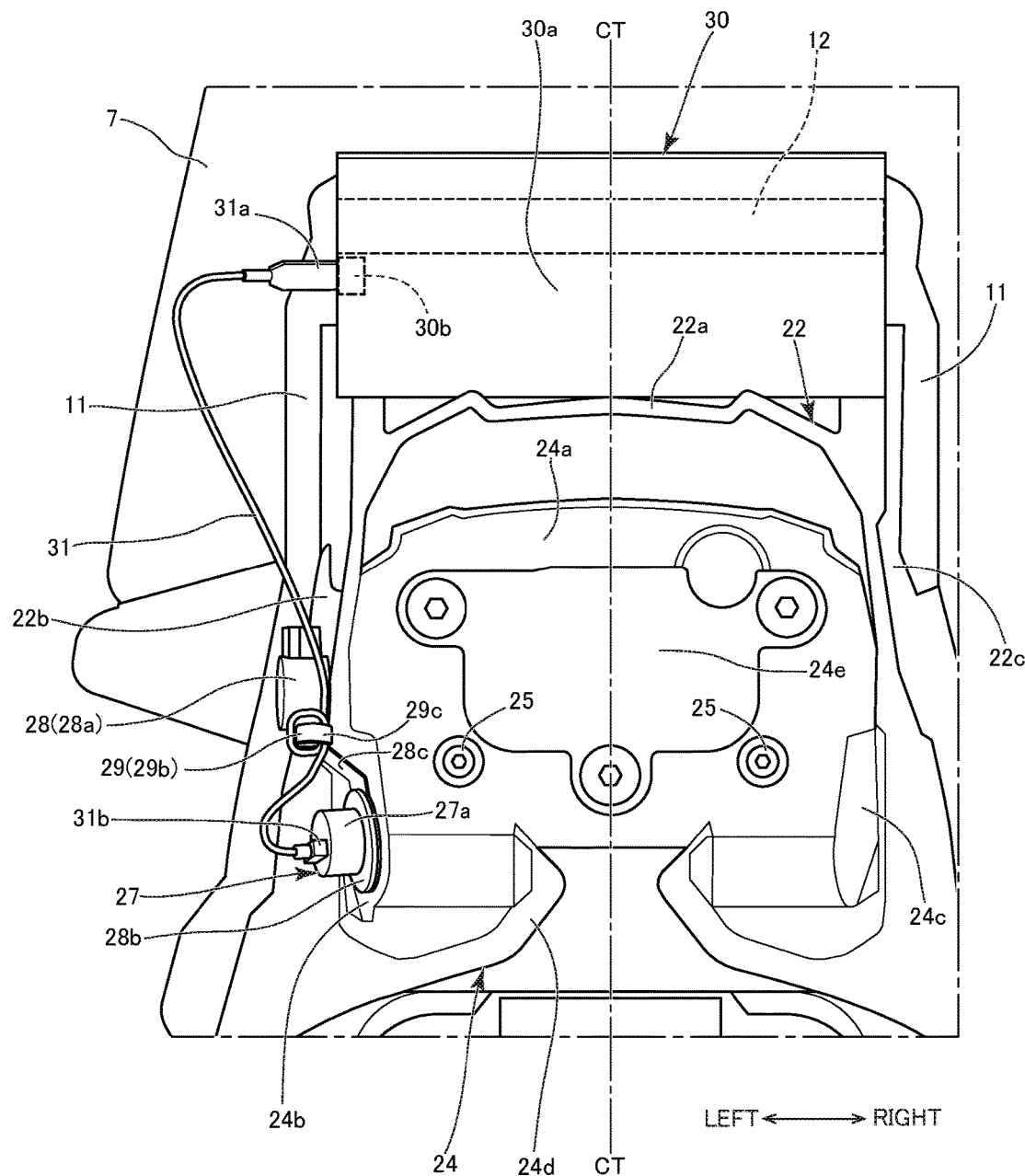
FIG. 6 is a view illustrating a state where an external device is installed in an external device holder above the instrument section from behind.
Figure 7:
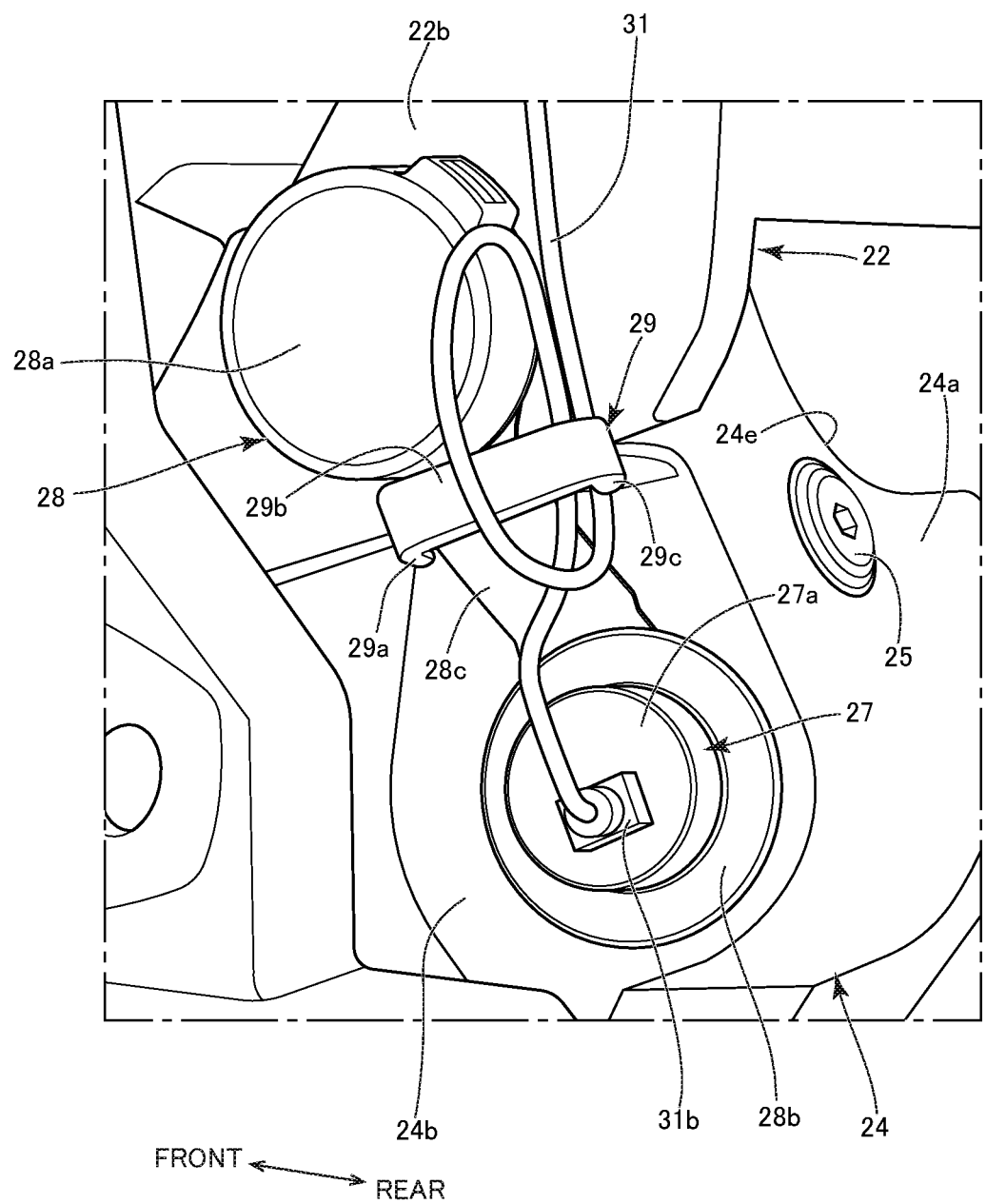
FIG. 7 is a perspective view illustrating a state where a cable is connected to the connector.
Figure 8:
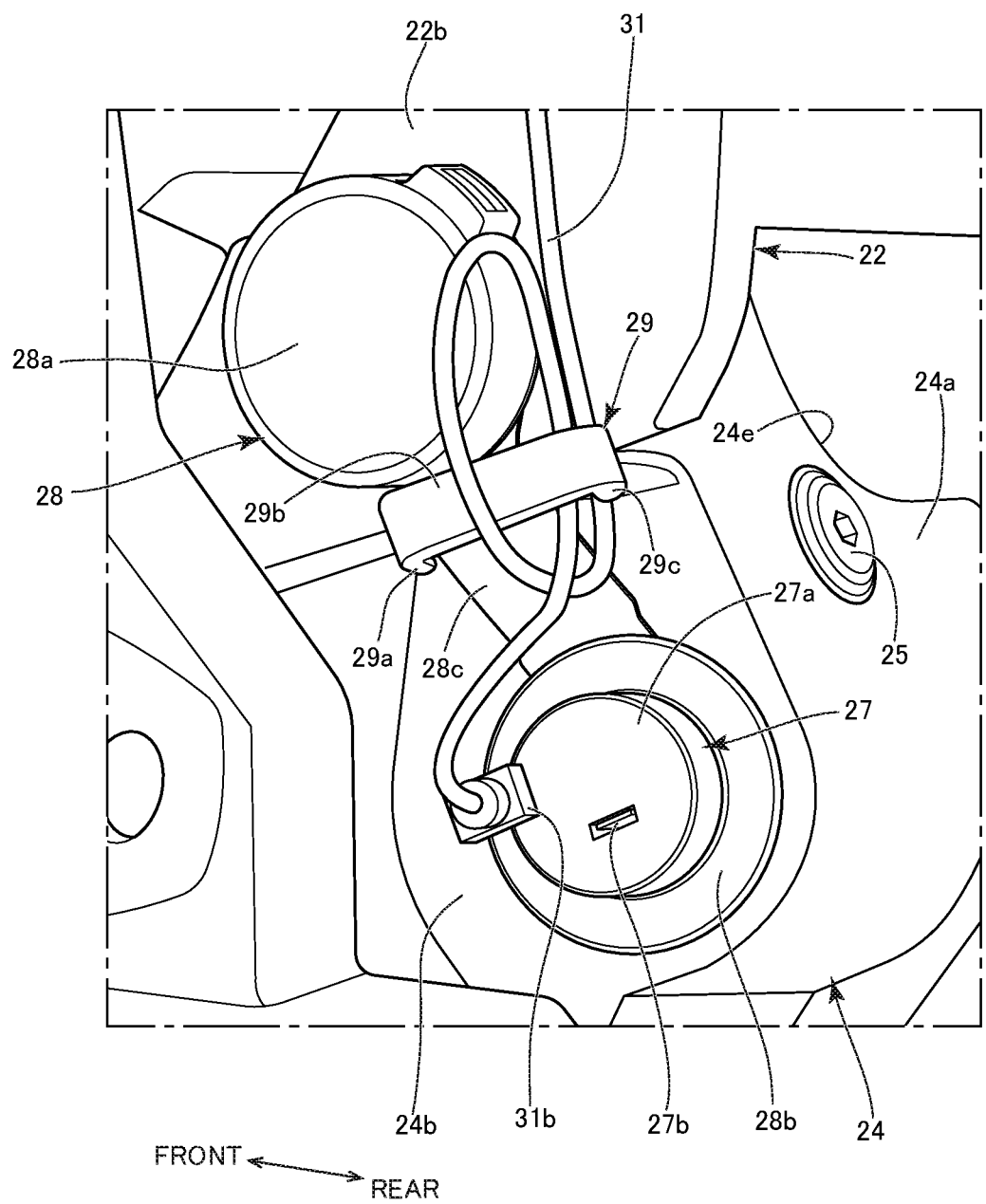
FIG. 8 is a perspective view illustrating a state where the cable is detached from the connector.

An instrument section 20 that is located below a rear of the windshield 7 is provided in a center portion in the vehicle body left-right direction forward of the handles 3 and the top bridge 13. The windshield 7 is a front shield portion that covers a front of the instrument section 20, and prevents a vicinity of the instrument section 20 from being directly exposed to running wind from front. The instrument section 20 includes an instrument main body 21, and an instrument cover 22 that covers an upper part of the instrument main body 21. The instrument main body 21 is configured by attaching a display section 23 to a display section support member 24. FIG. 6 to FIG. 8 illustrate a state where the display section 23 is detached from the display section support member 24.

The display section 23 is a part that displays various kinds of information concerning the motorcycle 1, and a rider visually recognizes display of various kinds of information through a display panel 23a. The display panel 23a faces slightly upward and faces a rear of the vehicle body, so that the display panel 23a is arranged to be easily recognized visually by the rider in a state sitting on a seat (not illustrated) of the motorcycle 1. Various types of display contents and display forms can be applied to a display content and a display form in the display section 23. The contents of the display are typically those related to, for example, a vehicle state and traveling such as a vehicle speed, an engine speed (rev), and a water temperature, but in addition to this, attendant information such as time may be displayed. The forms of the display may be analogue display by a mechanical meter, or may be digital display using liquid crystal, LED, or the like. In the display section 23, wiring (not illustrated) that extends from a back side of the display panel 23a is provided. The wiring is connected to a control section (not illustrated) of the motorcycle 1, and is used for transmission and reception of signals to and from the display section 23.

The display section support member 24 is attached to a subframe (not illustrated) that is the frame structure configurating the frame of the vehicle body 2. The subframe is attached to a frame main body portion (not illustrated) including the head pipe. As illustrated in FIG. 6, the display section support member 24 includes a support wall 24a that faces slightly upward and diagonally rearward, a left side wall 24b and a right side wall 24c located on a left and a right of the support wall 24a. The display section support member 24 further includes a base seat portion 24d located below the support wall 24a, the left side wall 24b and the right side wall 24c, and the base seat portion 24d is fixed to the subframe. In a center of the support wall 24a, a through-hole 24e is formed. The display section 23 is fixed to the display section support member 24 with a rear surface side of the display panel 23a supported on the support wall 24a, and wiring extended from the display section 23 is inserted into the through-hole 24e and is guided inside the vehicle body.

Figure 3:
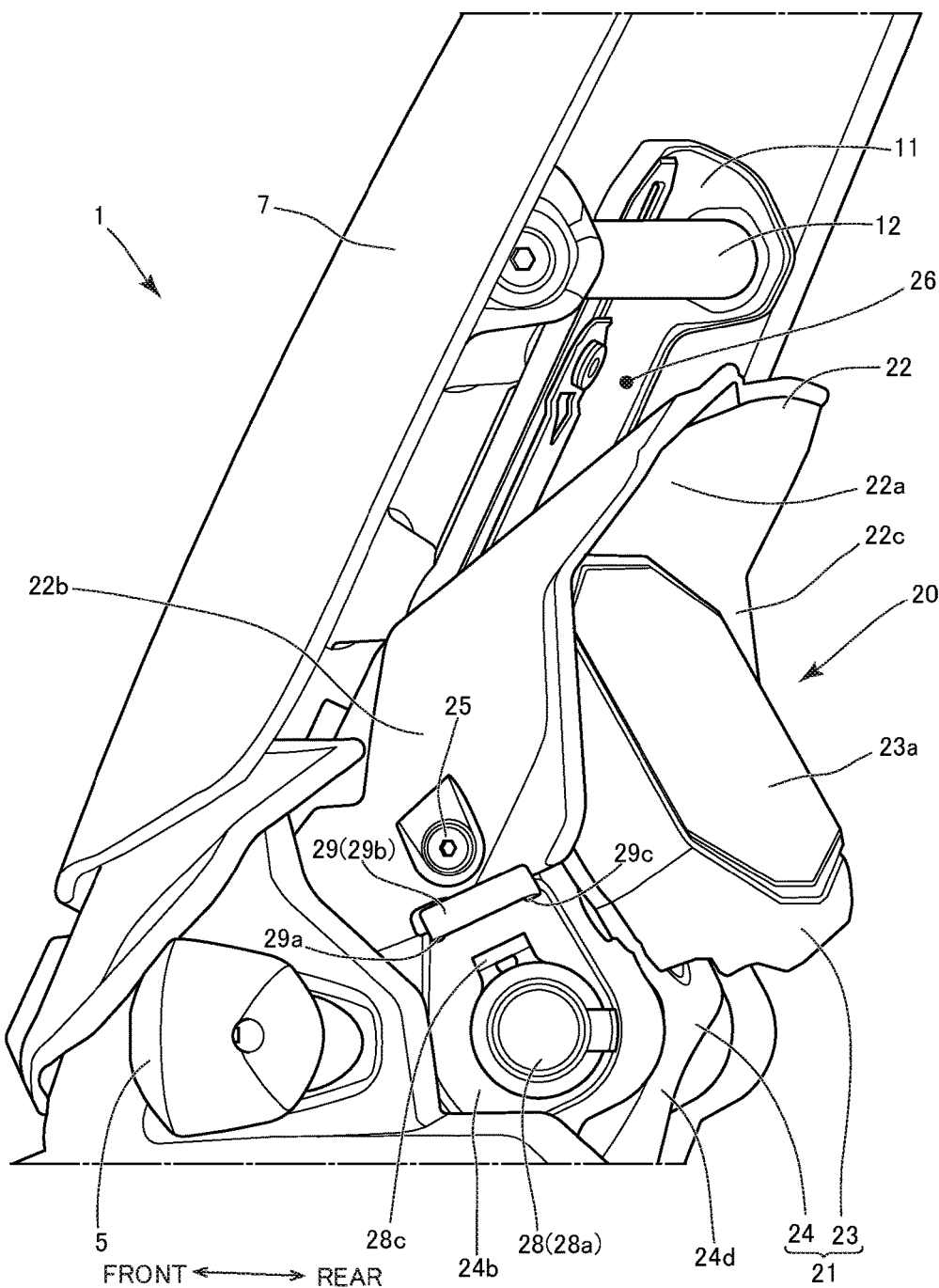
FIG. 3 is a perspective view illustrating the instrument section and the periphery of the instrument section from diagonally behind at a different angle from an angle in FIG. 2.

The instrument cover 22 includes an upper wall 22a located along an upper edge of the display section support member 24, a left side wall 22b and a right side wall 22c that are located on a left and a right of the upper wall 22a. As illustrated in FIG. 3, the upper wall 22a significantly protrudes upward to a back from the display panel 23a of the display section 23 supported on the support wall 24a, and has an eave-shaped structure that covers an upper part of the display section 23. The left side wall 2b covers an upper half part of the left side wall 24b of the display section support member 24 from a left, and the right side wall 22c covers an upper half part of the right side wall 24c of the display section support member 24 from a right. Respective lower half portions of the left side wall 24b and the right side wall 24c of the display section support member 24 are not covered with the instrument cover 22, and side surfaces of the display section support member 24 are exposed leftward and rightward.

The display section support member 24 and the instrument cover 22 are fastened and fixed (fixed by bolts) to the subframe by a plurality of fastening portions 25. As illustrated in FIG. 6, the display section support member 24 is fixed by the fastening portions 25 at a plurality of spots on the support wall 24a. Further, at the fastening portions 25 on left and right side portions, the display section support member 24 and the instrument cover 22 are fastened together to the subframe by common bolts. Note that FIG. 2 to FIG. 5 illustrate only the fastening portion 25 on a side where the left side wall 24b and the left side wall 22b are fastened together, but the right side wall 24c and the right side wall 22c are also fastened together with a similar structure (fastening portion 25). Though not illustrated, there are also fastening portions to the subframe by the fastening portions 25 in the upper wall 22a of the instrument cover 22 and the base seat portion 24d of the display section support member 24.

In this way, the instrument section 20 is configured by the instrument main body 21 including a combination of the display section 23 and the display section support member 24, and the instrument cover 22 that covers the upper part of the instrument main body 21. In the instrument section 20, the display section support member 24 plays a part of supporting the display section 23 and guiding the wiring that connects to the display section 23. The instrument cover 22 plays a role of protecting the display panel 23a, improving visibility of the display panel 23a (shielding sunlight from above, suppressing attachment of raindrops and the like to the display panel 23a), and improving design around the display section 23.

As illustrated in FIG. 1, a width (a space between the left side walls 22b and 24b, and the right side walls 22c and 24c) of the instrument section 20 in the vehicle body left-right direction is substantially same as a distance between the pair of stays 11. The width W1 of the windshield 7 is larger than the space between the pair of stays 11, and the width of the instrument section 20 in the vehicle body left-right direction is within a range of the width W1 of the windshield 7. In other words, in a vehicle body front view, the left and right side wall portions of the instrument section 20 (the left side wall 22b and the left side wall 24b, and the right side wall 22c and the right side wall 24c) are located more inward (closer to the center CT in the left-right direction) in the vehicle body left-right direction than left and right outer edges of the windshield 7. Further, since an upper edge of the windshield 7 is at a higher position than the upper wall 22a of the instrument cover 22 configuring an upper edge of the instrument section 20, the instrument section 20 is also within a range of a height of the windshield 7 in the vehicle body up-down direction. Accordingly, when the motorcycle 1 is seen from the front, the instrument section 20 is located behind the windshield 7, and does not protrude left and right and upward of the vehicle body 2.

An external device holder (holding portion) 26 on which an external device is installable is formed in a vicinity of the instrument section 20. The external device holder 26 is located behind the windshield 7 and above the instrument section 20. In the external device holder 26, an external device can be held by a cross girder portion 12 configuring a support portion of the windshield 7 with the pair of stays 11. Note that in holding the external device, the upper wall 22a of the instrument cover 22 that configures an upper edge portion of the instrument section 20 may be properly used.

FIG. 6 illustrates a state where a mobile electronic terminal 30 that is an external device is held in the external device holder 26. The mobile electronic terminal 30 is electronic equipment that performs information display on a display screen 30a like a smartphone, and a portable navigation device. As illustrated in FIG. 6, the mobile electronic terminal 30 has an outer shape in a rectangular plate shape (or a box shape), and is held in the external device holder 26 in such a manner that a rear surface portion opposite to the display screen 30a is placed on (leaned against) the cross girder portion 12. Note that when the mobile electronic terminal 30 is held in the external device holder 26, a long side portion of the mobile electronic terminal 30 may be placed on the upper wall 22a of the instrument cover 22. In this state, the display screen 30a faces slightly upward and faces rearward, and is oriented almost same as the display panel 23a of the display section 23. The display screen 30a is visually recognized by a rider in a state sitting on the seat (not illustrated) of the motorcycle 1 in a relationship in which the display screen 30a is located above the display panel 23a, and the display screen 30a and the display panel 23a are adjacent up and down with the upper wall 22a therebetween, so that it is possible to read information on both reliably with less movement of eyes.

A connector (connection portion) 27 for electrically connecting to the mobile electronic terminal 30 is provided at a side portion in the vehicle body left-right direction, of the instrument section 20. In the present embodiment, the connector 27 is provided at a side portion on the left side of the instrument section 20. As illustrated in FIG. 7 and FIG. 8, the connector 27 is provided on the display section support member 24, and has a columnar sideward protrusion portion 27a that protrudes leftward from the left side wall 24b, and a connector hole 27b is formed in an end surface (surface facing leftward) of the sideward protrusion portion 27a. An electric connection terminal is provided inside the connector hole 27b. The connector 27 is placed at a position close to a lower edge of the left side wall 24b, and the left side wall 22b of the instrument cover 22 is located above the connector 27.

An attachable and detachable protection cap 28 that protects the connector 27 is included. The protection cap 28 has a bottomed-cylindrical lid portion 28a capable of covering the sideward protrusion portion 27a, a base seat portion 28b that is attached to a base portion of the sideward protrusion portion 27a along a side surface of the left side wall 24b, and a band-shaped portion 28c that connects the lid portion 28a and the base seat portion 28b.

In a state where the connector 27 is not used (in a state where a second end portion 31b of a cable 31 described later is not connected to the connector hole 27b), as illustrated in FIG. 1 to FIG. 5, the protection cap 28 is attached to the connector 27 and the lid portion 28a is put on the sideward protrusion portion 27a. The protection cap 28 prevents foreign matters such as dust and water droplets from entering the connector hole 27b. The protection cap 28 is formed from a synthetic resin having flexibility, or the like, the lid portion 28a is put on the sideward protrusion portion 27a while slightly deforming in a diameter expansion direction, and is in a stably attached state without falling off from the connector 27. In the state where the lid portion 28a is put on the sideward protrusion portion 27a, the band-shaped portion 28c is in a shape curved in a U-shape. In a state where the connector 27 is used (a state where the second end portion 31b of the cable 31 is connected to the connector hole 27b), the lid portion 28a of the protection cap 28 is detached from the sideward protrusion portion 27a of the connector 27, and the connector hole 27b is exposed, as illustrated in FIG. 6 to FIG. 8.

As illustrated in FIG. 6, the mobile electronic terminal 30 and the connector 27 are connected via the cable 31. A first end portion 31a that is one end portion of the cable 31 is connected (inserted) to a connector hole 30b on a mobile electronic terminal 30 side, and the second end portion 31b that is the other end portion of the cable 31 is connected (inserted) to the connector hole 27b. The second end portion 31b is attachable to and detachable from the connector hole 27b, the second end portion 31b is moved from the left to the right to be inserted into the connector hole 27b, and when the second end portion 31b is detached from the connector hole 27b, the second end portion 31b is extracted toward the left. FIG. 7 illustrates a state where the second end portion 31b is inserted into the connector hole 27*b*, and FIG. 8 illustrates a state where the second end portion 31*b* is extracted from the connector hole 27*b*.

By connecting the mobile electronic terminal 30 to the connector 27 via the cable 31, it become possible to perform power supply to the mobile electronic terminal 30 from a power supply circuit (not illustrated) on the motorcycle 1 side, signal communication between the mobile electronic terminal 30 and the control section of the motorcycle 1, and the like. In other words, a connection terminal in the connector hole 27*b* is used as a port for power supply and signal communication, and is electrically connected to the power supply circuit and the control section on the motorcycle 1 side. As described above, the wiring extending from the display section 23 is passed through the inside of the display section support member 24. Internal wiring for power supply and for signal that is connected to the connector 27 (connector hole 27*b*) is also guided inside the display section support member 24, and configures an electric/electronic system of the motorcycle 1. Note that a role of the connector 27 to the mobile electronic terminal 30 may be both power supply and signal communication, or may be either one of them.

When the mobile electronic terminal 30 is installed in the external device holder 26 and is connected to the connector 27 via the cable 31, the connector hole 30*b* on the mobile electronic terminal 30 side to which the first end portion 31*a* connects is preferably faced to the left similarly to the connector hole 27*b* of the connector 27, as in FIG. 6. Thereby, the entire cable 31 is placed to a left to the external device holder 26 and the instrument section 20, and the cable 31 can be prevented from overlapping the display panel 23*a* and the display screen 30*a* and reducing visibility. Further, since the connector hole 30*b* and the connector hole 27*b* in the relationship arranged in the substantially up-down direction are connected, a length of the cable 31 is not excessively long and is simply routed, and the cable 31 can be restrained from greatly loosening, or being caught by a surrounding structure. However, if the length of the cable 31 is too short, there arises the fear that parts directly before the first end portion 31*a* and the second end portion 31*b* abruptly bend to receive an excessive load, or affects stability of the mobile electronic terminal 30 installed in the external device holder 26, and therefore, it is desirable that the length of the cable 31 has some margin.

At one side of the instrument section 20, a cable supporter (support portion) 29 that supports the cable 31 is included. The cable supporter 29 is provided at a side portion on a left side of the instrument section 20 similarly to the connector 27, is located in a middle of the mobile electronic terminal 30 (connector hole 30*b*) held by the external device holder 26 and the connector 27 (connector hole 27*b*), and supports a midway part of the cable 31. In more detail, the left side portion of the instrument section 20 is configured by the left side wall 24*b* of the display section support member 24 and the left side wall 22*b* of the instrument cover 22. As described above, the connector 27 is provided at the left side wall 24*b*. In contrast to this, the cable supporter 29 is provided at a lower edge of the left side wall 22*b*, and is located above the connector 27.

Figure 5:
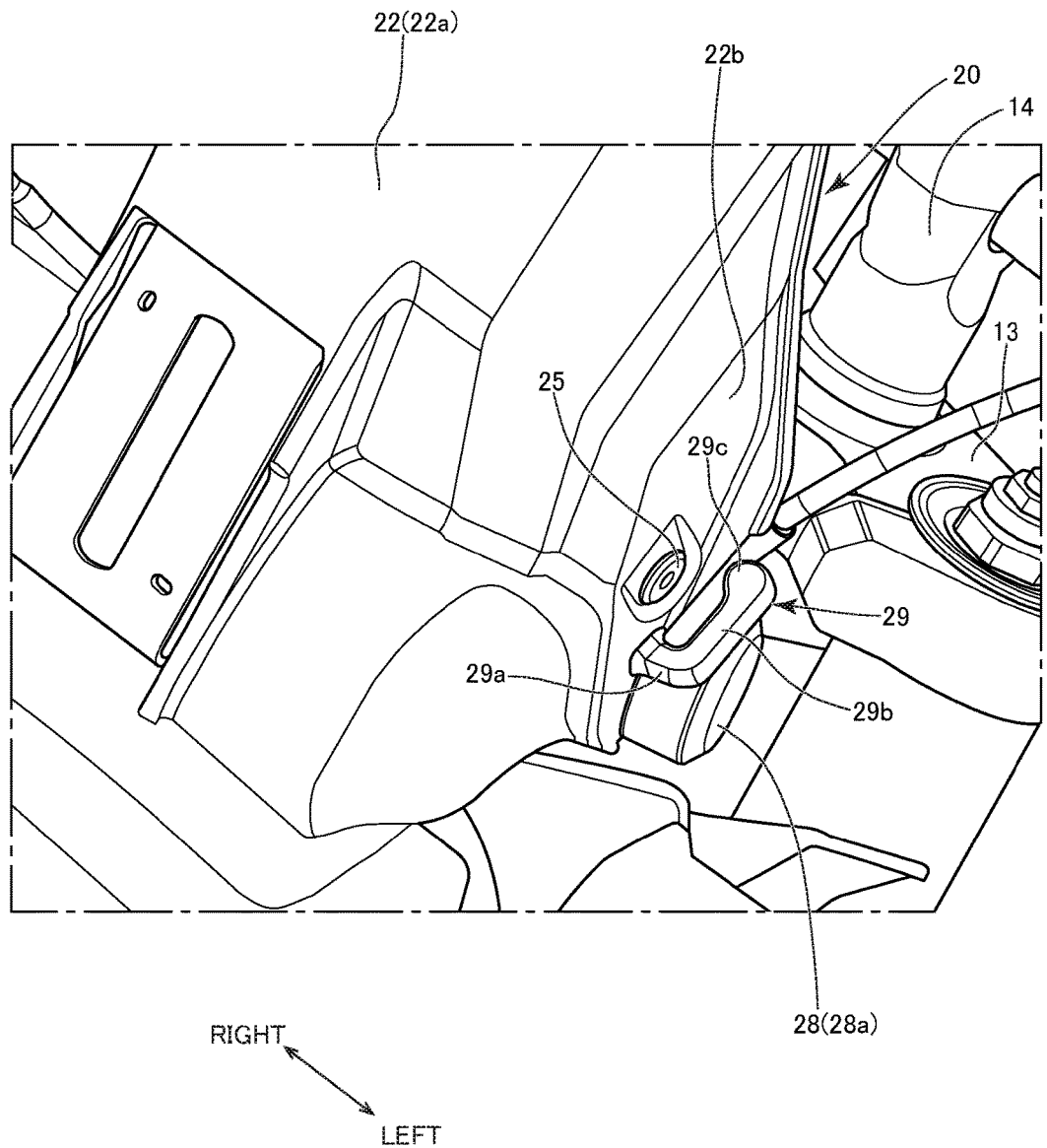
FIG. 5 is a perspective view illustrating a vicinity of a connector of the periphery of the instrument section from diagonally front.

As illustrated in FIG. 5, the cable supporter 29 is of a hook type in a cantilever shape, and includes a base end portion 29*a* that protrudes leftward from the left side wall 22*b* of the instrument cover 22, a rearward extension portion 29*b* that is bent to the base end portion 29*a* to extend diagonally rearward, and a retaining portion 29*c* provided at a tip of the rearward extension portion 29*b*. The rearward extension portion 29*b* forms a predetermined gap between the rearward extension portion 29*b* and the left side wall 22*b* (a left side surface of the instrument section 20), and the gap is an insertion space through which the cable 31 is passed. The insertion space is opened rearward and forms an outlet/inlet portion. The retaining portion 29*c* has a wall thickness made larger toward the right than the rearward extension portion 29*b*, and narrows a width of the inlet/output portion of the insertion space.

When the cable 31 is caused to be supported by the cable supporter 29, the cable 31 is moved from the rear to the front, and the cable 31 is inserted into the insertion space (a space between the rearward extension portion 29*b* and the left side wall 22*b*) through the outlet/inlet portion. The cable supporter 29 restrains movement of the cable 31 to the front by the base end portion 29*a*, and restrains movement of the cable 31 to the left by the rearward extension portion 29*b*. Thereby, the cable 31 is stably supported along the left side portion of the instrument section 20 (see FIG. 6 to FIG. 8). Since the width of the outlet/inlet portion of the insertion space is narrowed by the retaining portion 29*c*, the inserted cable 31 is prevented from unintentionally slipping rearward from the insertion space, and support of the cable 31 by the cable supporter 29 is reliably maintained.

Note that in FIG. 6 to FIG. 8, as an example of supporting the cable 31 having a margin in length, a support form in which the cable 31 is wound around the rearward extension portion 29*b* of the cable supporter 29 once or more is illustrated, but the support form of the cable 31 by the cable supporter 29 is not limited to this. For example, when the cable 31 is shorter than what is illustrated, the cable 31 may only be simply passed linearly between the rearward extension portion 29*b* and the left side wall 22*b* without being wound around the rearward extension portion 29*b*. Alternatively, when the cable 31 is longer than what is illustrated, a number of times of winding of the cable 31 around the rearward extension portion 29*b* may be increased. Since the rearward extension portion 29*b* has a length with a margin in the front-rear direction, support of the cable supporter 29 can be performed without undue stress even if the number of times of winding of the cable 31 increases.

When the cable 31 is detached from the cable supporter 29, the cable 31 is detached rearward from the insertion space (between the rearward extension portion 29*b* and the left side wall 22*b*) through the outlet/inlet portion. As illustrated in FIG. 5, in the retaining portion 29*c*, a side facing the left side wall 22*b* curves in a protruded surface shape, so that when the cable 31 is moved rearward, the cable 31 is guided to the outlet/inlet portion along a curving shape of the retaining portion 29*c*, and the cable 31 can be detached smoothly without being caught. The retaining portion 29*c* is set in such a shape that does not allow the cable 31 to detach from the insertion space easily by a behavior of the cable 31 that is caused by influence of vibration and running wind at the time of traveling of the motorcycle 1, and allows the cable 31 to detach smoothly from the insertion space when the cable 31 is moved rearward with an intension to detach the cable 31.

As above, the connector 27 is provided on one side of the instrument section 20 so that the cable 31 is disposed sideward of the instrument section 20, and thereby the cable 31 can be prevented from overlapping the display panel 23*a* and the display screen 30*a* to reduce the information visibility on the instrument section 20 and the mobile electronic terminal 30. Moreover, when the cable 31 placed sideward of the instrument section 20 is allowed to have a certain margin in length, the cable 31 is stably supported by the cable supporter 29 provided at one side of the instrument section 20, and the cable 31 can be prevented from interfering with the handle 3 and the like to affect operability, and the cable 31 can be prevented from significantly behaving by vibration and running wind during traveling and offending the eye of the rider. Since the vicinity of the instrument section 20 is a part that is easily noticed by the rider in the riding posture, if the cable is shaken around the instrument section 20, the cable is likely to be an offence to the eye, but stable support of the cable 31 by the cable supporter 29 can create an environment where the rider can concentrate on driving operations. In other words, it is possible to achieve both convenience of the instrument section 20 and the mobile electronic terminal 30 (including connection by the cable 31), and comfortability at the time of traveling of the motorcycle 1.

As illustrated in FIG. 6, in the vehicle body left-right direction, the cable supporter 29 is in a substantially same position as the position of the connector 27. Therefore, the cable 31 is prevented from significantly veers leftward, from the connector 27 to the cable supporter 29. With this, veer of the cable 31 to the left is also restrained in a range from the cable supporter 29 to the connector hole 30b of the mobile electronic terminal 30. Note that the cable supporter 29 may be configured to be located inward (close to the center CT in the left-right direction) in the vehicle left-right direction from the connector 27, so that veer of the cable 31 to the left is decreased more.

The cable supporter 29 is formed integrally with the instrument cover 22, and is obtained at low cost without involving increase in number of components. Further, unlike the display section support member 24 configuring the instrument main body 21, the instrument cover 22 has a simple configuration without including an assembled portion (support wall 24a) for the display section 23 or a connection portion (connector 27 and the like) for electric/electronic systems, and the cable supporter 29 is easily formed.

In more detail, the instrument cover 22 is in a U-shape covering an upper side, and the left and right (the left side wall 24b and the right side wall 24c) of the instrument main body 21 (in particular, the display section support member 24), and the cable supporter 29 is provided along the lower edge of the left side wall 22b of the instrument cover 22, so that it takes no effort to manufacture the instrument cover 22 including the cable supporter 29. In particular, the cable supporter 29 is in the cantilever shape in which the rearward extension portion 29b and the retaining portion 29c extend rearward from the base end portion 29a that connects to the left side wall 22b. Therefore, when the instrument cover 22 is a molded product, it is possible to easily manufacture the cable supporter 29 by die cutting in the front-rear direction or the up-down direction. The entire instrument cover 22 (the upper wall 22a, the left side wall 22b and the right side wall 22c) that forms a substantially U-shaped sectional shape extending in the front-rear direction can also be manufactured by die cutting in the front-rear direction and the up-down direction, so that a special step and die structure for molding the cable supporter 29 are not required, and the instrument cover 22 including the cable supporter 29 can be obtained easily at low cost.

Further, by providing the cable supporter 29 at the lower edge of the left side wall 22b, a hole or a large protruded portion does not have to be provided on an outside surface of the instrument section 20 (in particular, the display section 23) that is easy to see from the surroundings, and it is possible to maintain a fearless impression without impairing design around the instrument section 20. Further, the cable supporter 29 hardly affects finishing of a plane part (the upper wall 22a, the left side wall 22b, the right side wall 22c) of the instrument cover 22 at the time of molding of the instrument cover 22, and also has an advantage of a degree of freedom of the shape being high.

As described above, the width of the instrument section 20 in the vehicle body left-right direction is within the width W1 of the windshield 7. The cable supporter 29 is a site that protrudes leftward of the instrument section 20, and as illustrated in FIG. 1, the cable supporter 29 is also located closer to the center CT in the left-right direction of the vehicle body 2 than an outer edge of the left side of the windshield 7, and is within the range of the width W1 of the windshield 7 in the vehicle body left-right direction. In this way, in the vehicle body front view, the cable supporter 29 is disposed inward in the vehicle body left-right direction from the outer edge of the windshield 7, and supports the cable 31 extending from the mobile electronic terminal 30 in a state where the cable 31 is hidden inward of the windshield 7, whereby the cable 31 hardly receives the influence of the running wind from front, and the cable 31 can be stably held.

As illustrated in FIG. 6, the cable 31 that connects the mobile electronic terminal 30 (connector hole 30b) and the connector 27 (connector hole 27b) extends substantially in the up-down direction. The cable supporter 29 is located closer to the connector 27 than the mobile electronic terminal 30 in the up-down direction. In other words, the cable supporter 29 is configured to support a spot that is at the connector 27 side from a middle point of the cable 31. In this way, a length to the second end portion 31b from the spot where support by the cable supporter 29 is received in the cable 31 becomes short by disposing the cable supporter 29 at a side close to the connector 27, and therefore even if the second end portion 31b of the cable 31 falls off from the connector 27 (see FIG. 8), swing of the cable 31 can be reduced to be small. Therefore, the rider can hold the second end portion 31b again without any trouble and easily reconnect the second end portion 31b to the connector hole 27b.

When the cable supporter 29 is too close to the connector 27, the cable 31 receiving support of the cable supporter 29 is abruptly bent rightward just before the second end portion 31b, and there arises the fear that a load exerted on the cable 31 increases in the vicinity of the second end portion 31b, or attaching and detaching operations of the second end portion 31b to and from the connector hole 27b are difficult to perform. Considering this point, the cable supporter 29 is disposed at a position that is separated to a certain degree from the connector 27 (see FIG. 6). Specifically, it is preferable to provide the cable supporter 29 closer to the mobile electronic terminal 30 than a position of a quarter, from the connector 27 side, of a route of the cable 31 from the mobile electronic terminal 30 (connector hole 30b) to the connector 27 (connector hole 27b). In this way, the cable supporter 29 is provided by being separated to some degree from the connector 27, whereby even in the state where the cable 31 is supported by the cable supporter 29, a flex length of the cable 31 is secured to make a trajectory to the second end portion 31b gentle, and it is possible to reduce the load in the vicinity of the second end portion 31b, and attach and detach the second end portion 31b easily.

Note that the position of the connector 27 is also related to the trajectory of the cable 31 in the vicinity of the second end portion 31b. The connector 27 is provided at the position close to the lower edge of the left side wall 24b of the display section support member 24, and is located close to a lower side of an entire left side surface of the instrument section 20. Thereby, the connector 27 is in a positional relation in which the connector 27 has a certain amount of space in the up-down direction, with respect to the cable supporter 29 that is similarly provided on the left side surface of the instrument section 20, and the trajectory of the cable 31 from the cable supporter 29 to the connector 27 can be made comfortable.

As illustrated in FIG. 7 and FIG. 8, the cable supporter 29 also includes a function of supporting the band-shaped portion 28c of the protection cap 28, in addition to support of the cable 31. When the cable 31 is connected to the connector 27, in order to expose the connector hole 27b, the lid portion 28a of the protection cap 28 is detached from the sideward protrusion portion 27a. Since the lid portion 28a is connected to the base seat portion 28b via the band-shaped portion 28c, the detached lid portion 28a does not fall, but since the connection is made through the band-shaped portion 28c with flexibility, there is a possibility that the lid portion 28a is shaken by vibration and running wind at the time of traveling of the motorcycle 1 and becomes an offence to the rider's eye. The band-shaped portion 28c is supported by being inserted into the aforementioned insertion space between the cable supporter 29 (rearward extension portion 29b) and the instrument cover 22 (left side wall 22b), whereby the lid portion 28a in the detached state is stabilized, and can be prevented from being an offence to the rider's eye. Since the band-shaped portion 28c is in a thin band shape, and a ratio of the band-shaped portion 28c to the insertion space between the cable supporter 29 and the instrument cover 22 is small, the band-shaped portion 28c does not hinder support of the cable 31 by the cable supporter 29. Further, the band-shaped portion 28c supported by the cable supporter 29 also has an effect of reducing vibration and the like of the cable 31 to the cable supporter 29.

Since support of the band-shaped portion 28c by the cable supporter 29 becomes difficult when a distance of the cable supporter 29 from the connector 27 is too far, in the relationship between the protection cap 28 and the cable supporter 29, the cable supporter 29 is disposed close to the connector 27 to some extent. Specifically, it is preferable to provide the cable supporter 29 within a range of a diameter of the lid portion 28a in the protection cap 28 from an outer edge (outer peripheral surface of the sideward protrusion portion 27a in the columnar shape) of the connector 27. The position of the cable supporter 29 of the present embodiment satisfies the relevant condition (see FIG. 7 and FIG. 8). By adopting the distance setting of the cable supporter 29 and the connector 27 with a dimension of the protection cap 28 as a reference, the protection cap 28 can be reliably supported by the cable supporter 29 similarly to the cable 31.

Note that an outer shape of the sideward protrusion portion 27a of the connector 27 is in a circular (cylindrical) shape in the present embodiment, but a connector having a noncircular outer shape can also be used. In this case, a protection cap that protects the connector also has a noncircular outer shape. When the protection cap has a noncircular outer shape, it is preferable to provide the cable supporter within a range of a dimension in a longitudinal direction of the protection cap from an outer edge of the connector. In other words, regardless of the shapes of the connector and the protection cap, support of the protection cap by the cable supporter is easily performed by providing the cable supporter within the range of the outer shape size (a diameter, a dimension in the longitudinal direction) of the protection cap from the outer edge of the connector.

In the present embodiment, the only one cable supporter 29 is included on the one side of the instrument section 20, but the number of cable supporters may be two or more. When a plurality of cable supporters are included, it is preferable to configure the plurality of cable supporters to include a first cable supporter that is provided at a position closer to the connector 27 than the external device (mobile electronic terminal 30) installed in the external device holder 26, and a second cable supporter that is provided at a position closer to the external device (mobile electronic terminal 30) installed in the external device holder 26 than the connector 27. Thereby, the cable 31 can be more stabilized along the one side of the instrument section 20. Note that the first cable supporter on the side close to the connector 27 more preferably satisfies the conditions described above concerning the cable supporter 29.

The present invention can be carried out by being variously changed without being limited to the above described embodiment and modifications. In the above described embodiment and modifications, it is possible to properly change the configurations and control illustrated in the accompanying drawings within the range in which the effect of the present invention is exhibited without being limited to the configurations and control illustrated in the accompanying drawings. In addition, it is possible to carry out the present invention by properly changing the present invention within the range without departing from the object of the present invention.

Although in the above described embodiment, the connector 27 and the cable supporter 29 are provided at the side portion on the left side of the instrument section 20, the connector may be provided at a side portion on a right side of the instrument section 20. In this case, the other components (the protection cap 28, the connector hole 30b of the mobile electronic terminal 30, the cable 31) relating to connection of the mobile electronic terminal 30 may also be disposed with the left and the right reversed from the above described embodiment.

In the above described embodiment, the external device holder 26 is located directly above the instrument section 20, but it is also possible to apply the present invention to a configuration in which the external device holder is located in front of the instrument section. Further, in the above described embodiment, the upper wall 22a of the instrument cover 22 that is a part of the instrument section 20 configures a lower end portion of the external device holder 26, but a configuration in which the external device holder and the instrument section are completely independent from each other may be adopted.

In the above described embodiment, a front shield portion that covers a front of the instrument section 20 is the windshield 7, but a front shield portion other than the windshield may be adopted. As one example, a front cover separate from the windshield may be provided, or a configuration in which a part of the front cowl goes around in front of the instrument section may be adopted.

In the above described embodiment, the connector 27 to which the second end portion 31b of the cable 31 is connected is provided at the display section support member 24 at the main body 21, but it is also possible to use another electric component in the vicinity of the instrument as a connection destination of the cable, instead of the instrument itself. For example, when a component relating to control of the vehicle is provided adjacently to the instrument, the component may be used as the connection destination of the cable.

The cable supporter 29 of the above described embodiment is of a hook type in a cantilever shape having the outlet/inlet portion opened to the rear edge side, but it is also possible to apply a cable supporter in a shape other than this. For example, the cable supporter may be a cable supporter of a type in which an orientation of the outlet/inlet portion is in the vehicle body left-right direction, a cable supporter in a hole shape without an open portion (outlet/inlet portion) in a peripheral edge or the like.

The vehicle including the external device support structure of the present invention is not limited to motorcycles, but application to all saddle riding vehicles in which an instrument and an external device are disposed in front of a rider is possible, such as tricycles, four wheelers, and other transport machines.

As described above, the external device support structure of a saddle riding vehicle of the present invention has an effect of being able to support the external device and the connecting cable functionally, and improve convenience of the external device and the connecting cable, and comfortability at the time of traveling of the vehicle, and is particularly useful in a motorcycle or the like in which an external device is installed in a vicinity of an instrument section.

REFERENCE SIGNS LIST

1: motorcycle
2: vehicle body
3: handle
7: windshield (front shield portion)
20: instrument section
21: instrument main body
22: instrument cover
22a: upper wall
22b: left side wall (one side of instrument section, 23 side wall portion)
22c: right side wall
23: display section
23a: display panel
24: display section support member
24b: left side wall (one side of instrument section)
24c: right side wall
25: fastening portion
26: external device holder
27: connector
27a: sideward protrusion portion
27b: connector hole
28: protection cap
28a: lid portion
28c: band-shaped portion
29: cable supporter
29a: base end portion
29b: rearward extension portion
29c: retaining portion
30: mobile electronic terminal (external device)
30a: display screen
31: cable
31a: first end portion
31b: second end portion

What is claimed is:

1. An external device support structure of a saddle riding vehicle, the saddle riding vehicle including an external device holder in which an external device is installable, a connector for connecting the external device via a cable, and a protection cap which is attachable to and detachable from the connector, wherein:

the external device holder is provided in front of a rider and above or in front of an instrument section visible by the rider when sitting on a seat of the saddle riding vehicle so that the external device holder and the instrument section are visually recognizable by the rider when sitting on the seat, the connector is provided on one side of the instrument section in a left-right direction of a vehicle body of the saddle riding vehicle, the cable extends in at least one of an up-down direction and a front-rear direction along the one side of the instrument section and connects to the connector and the external device, a cable supporter that supports the cable is provided on the one side of the instrument section to be exposed on an outside of the vehicle body, the cable supporter is provided at a position closer to the connector than the external device installed in the external device holder, the cable supporter is located within a range of an outer shape size of the protection cap from an outer edge of the connector, and the cable supporter supports the protection cap when the protection cap is detached from the connector.

2. The external device support structure according to claim 1, wherein:

the instrument section includes an instrument main body and an instrument cover that covers an upper side of the instrument main body, and the instrument cover includes a side wall portion located above the connector on the one side of the instrument section, and the cable supporter is provided at the side wall portion.

3. The external device support structure according to claim 2, wherein the cable supporter is provided at a lower edge of the side wall portion of the instrument cover.

4. The external device support structure according to claim 1, further comprising a front shield portion that covers a front of the instrument section, wherein the cable supporter is located inward in the left-right direction from an outer edge of the front shield portion, when viewed from a front of the vehicle body.

5. The external device support structure according to claim 1, wherein:

the cable includes a first end portion that connects to the external device installed in the external device holder and a second end portion that connects to the connector, and the cable supporter is provided closer to the first end portion of the cable than a position of a quarter of a distance measured from the second end portion of the cable to the first end portion thereof in a state where the cable is respectively connected to the connector and the external device installed in the external device holder.

6. The external device support structure according to claim 1, comprising a plurality of the cable supporters having different positions in an up-down direction, on the one side of the instrument section, wherein the plurality of the cable supporters include a first cable supporter that is provided at the position closer to the connector than the external device installed in the external device holder, and a second cable supporter that is provided at a position closer to the external device installed in the external device holder than the connector.

7. The external device support structure according to claim 1, wherein the cable supporter is visually recognizable by the rider when sitting on the seat of the saddle riding vehicle.

8. The external device support structure according to claim 1, wherein the cable supporter is visible as viewed from the one side of the instrument section.

9. The external device support structure according to claim 1, wherein:
- the cable supporter is of a hook type in a cantilever shape and defines an insertion space through which the cable is passed, the insertion space opening rearward via an outlet/inlet portion, and
- the cable supporter includes a retaining portion that narrows a width of the inlet/outlet portion of the insertion space in the left-right direction.

\* \* \* \* \*